United States Patent
Paradis et al.

(10) Patent No.: US 7,735,279 B2
(45) Date of Patent: Jun. 15, 2010

(54) POLYMER-BASED COMPOSITE STRUCTURAL UNDERLAYMENT BOARD AND FLOORING SYSTEM

(75) Inventors: Duane R. Paradis, Highlands Ranch, CO (US); Patrick William Tierney, Castle Rock, CO (US)

(73) Assignee: Johns Manville, Denver, CO (US)

( * ) Notice: Subject to any disclaimer, the term of this patent is extended or adjusted under 35 U.S.C. 154(b) by 301 days.

(21) Appl. No.: 11/525,583

(22) Filed: Sep. 22, 2006

(65) Prior Publication Data

US 2008/0124530 A1 May 29, 2008

(51) Int. Cl.
*E04F 15/22* (2006.01)

(52) U.S. Cl. .................... 52/403.1; 52/309.1; 52/309.4; 52/408; 52/480; 52/796.1; 428/316.6; 428/319.7; 428/319.3

(58) Field of Classification Search ................... 52/408, 52/403.1, 309, 747.1, 309.1–309.5, 309.8–309.9, 52/309.11–309.12, 309.17, 403, 309.14, 52/782.1, 796.1, 480; 428/316.6, 319.3, 428/319.7
See application file for complete search history.

(56) References Cited

U.S. PATENT DOCUMENTS

| | | | | |
|---|---|---|---|---|
| 1,250,622 A * | 12/1917 | Munro | ........................... | 52/98 |
| 2,999,041 A * | 9/1961 | Lappala | ....................... | 428/101 |
| 3,284,980 A * | 11/1966 | Dinkel | .......................... | 52/600 |
| 3,770,559 A * | 11/1973 | Jackson | ..................... | 428/40.3 |
| 4,349,398 A * | 9/1982 | Kearns et al. | ................. | 156/71 |
| 4,414,265 A * | 11/1983 | Rosato et al. | .................. | 442/55 |
| 4,558,550 A * | 12/1985 | Marchais et al. | ............ | 52/309.7 |
| 5,644,880 A * | 7/1997 | Lehnert et al. | ................ | 52/408 |
| 5,834,082 A * | 11/1998 | Day | ........................... | 428/56 |
| 6,308,482 B1 * | 10/2001 | Strait | ........................... | 52/408 |
| 6,358,599 B1 * | 3/2002 | Deibel et al. | ............. | 428/308.4 |
| 6,418,691 B1 * | 7/2002 | Stroppiana | .................... | 52/480 |
| 6,576,577 B1 | 6/2003 | Garner | | |
| 6,698,150 B1 * | 3/2004 | DiLorenzo | .................... | 52/414 |
| 6,996,947 B2 | 2/2006 | Albora | | |
| 7,325,325 B2 * | 2/2008 | Gleeson | ....................... | 33/563 |
| 2002/0025751 A1 * | 2/2002 | Chen et al. | ................... | 442/324 |
| 2002/0127933 A1 * | 9/2002 | Baccus et al. | ................. | 442/86 |
| 2003/0033775 A1 * | 2/2003 | Nordgren et al. | ........... | 52/309.8 |
| 2003/0167715 A1 * | 9/2003 | Messenger et al. | ........ | 52/309.12 |
| 2004/0082240 A1 * | 4/2004 | Rodrigues | ..................... | 442/104 |
| 2005/0142348 A1 * | 6/2005 | Kajander et al. | .......... | 428/316.6 |
| 2005/0202228 A1 * | 9/2005 | Kajander et al. | .......... | 428/294.7 |
| 2005/0260400 A1 * | 11/2005 | Schweitzer et al. | ...... | 428/316.6 |
| 2005/0281999 A1 * | 12/2005 | Hofmann et al. | ......... | 428/304.4 |

(Continued)

*Primary Examiner*—Brian E Glessner
*Assistant Examiner*—James J Buckle, Jr.
(74) *Attorney, Agent, or Firm*—Robert D. Touslee

(57) ABSTRACT

A building flooring system includes a plurality of polymer-based composite structural underlayment boards overlaying and secured to a building subfloor to form an underlayment layer over the building subfloor and a nonstructural finish-flooring layer overlaying and bonded to the underlayment layer. The polymer-based composite structural underlayment boards each have a polymer material core layer or a predominantly polymer material core layer that typically contains from 1% to 40% by weight filler(s) and a density between 1.6 lbs/ft$^3$ and 25 lbs/ft$^3$. At least the top or bottom major surface of each of the polymer-based composite structural underlayment boards is overlaid by a facer that reinforces and strengthens the polymer-based composite structural underlayment board and that is generally coextensive with and bonded to the overlaid major surface of the polymer-based composite structural underlayment board.

25 Claims, 2 Drawing Sheets

U.S. PATENT DOCUMENTS

2006/0032170 A1* 2/2006 Vershum et al. ............ 52/403.1
2006/0068186 A1* 3/2006 Leclercq et al. .......... 428/294.7
2006/0130416 A1* 6/2006 Mohr et al. ................ 52/403.1
2006/0183387 A1* 8/2006 Taylor et al. .................. 442/30
2007/0289238 A1* 12/2007 Payne et al. ................... 52/408

* cited by examiner

POLYMER-BASED COMPOSITE STRUCTURAL UNDERLAYMENT BOARD AND FLOORING SYSTEM

BACKGROUND OF THE INVENTION

The subject invention relates to building flooring systems and in particular to a polymer-based composite structural underlayment board and an improved building flooring system that includes a plurality of the polymer-based composite structural underlayment boards overlaying and secured to a building subfloor to form an improved underlayment layer over the building subfloor and a nonstructural finish-flooring layer overlaying and bonded to the underlayment layer. As used in this specification and claims, a "nonstructural finish-flooring layer" is a flooring layer formed of: hard, rigid tiles (e.g. ceramic tiles); thin, flat or substantially flat manmade or natural hard rigid stone slabs (e.g. marble slabs and flagstones such as sandstone and shale slabs); linoleum; and resilient tiles (e.g. vinyl tiles).

In current building flooring systems, the nonstructural finish-flooring layers of the systems may be bonded directly to the upper surfaces of the building's subfloors, e.g. concrete subfloors. However, typically, current flooring systems include underlayment layers formed of plywood boards, hardboards, particleboards, gypsum boards, or fiber cement boards. The boards of these underlayment layers are secured to the upper surfaces of the building subfloors and the nonstructural finish-flooring layers are bonded directly to the upper surfaces of the underlayment layers. While these underlayment boards perform satisfactorily, the physical properties of these underlayment boards, such as but not limited to their weight, handleablity, cutablity, durability, flame spread rating, water absorption and/or fungus growth characteristics, etc. can present problems during the installation of the underlayment layer and over the anticipated service life of a flooring system. Accordingly, there has remained a need for an improved flooring system which utilizes an underlayment layer that is formed by underlayment boards that can be relatively light in weight, that are easy to handle, and that are easily cut at the job site to form the underlayment layer. There has also remained a need for an improved flooring system that includes an underlayment layer made of underlayment boards that are strong and durable, that absorb and retain very little moisture, that are fungus growth resistant, that are flame spread resistant, that have relatively good thermal and acoustical properties, and that have good bonding surfaces for bonding a nonstructural finish-flooring layer to an underlayment layer formed by the underlayment boards.

SUMMARY OF THE INVENTION

The improved building flooring system of the subject invention provides a solution for the problems associated with current flooring systems by providing a flooring system that includes an underlayment layer of polymer-based composite structural underlayment boards. The polymer-based composite structural underlayment boards of the subject invention and, in particular, the polyisocyanurate and predominantly polyisocyanurate polymer-based composite underlayment boards of the subject invention have good dimensional stability, can be relatively light in weight, are easy to handle, and can be easily cut at the job site to form an underlayment layer. In addition, these polymer-based composite structural underlayment boards and, in particular, the polyisocyanurate and predominantly polyisocyanurate polymer-based composite structural underlayment boards of the subject invention exhibit good thermal and acoustical properties, are strong and durable, absorb and retain very little moisture, are fungus growth resistant, are flame spread resistant, and have good bonding surfaces for bonding a nonstructural finish-flooring layer to an underlayment layer formed by the polymer-based composite structural underlayment boards.

The improved building flooring system of the subject invention includes a plurality of polymer-based composite structural underlayment boards overlaying and secured to a building subfloor to form a underlayment layer over the building subfloor and a nonstructural finish-flooring layer overlaying and bonded to the underlayment layer. Each of the polymer-based composite structural underlayment boards has a polymer material core layer or a predominantly polymer material core layer containing one or more fillers with a density between 1.6 lbs/ft$^3$ and 25 lbs/ft$^3$. The polymer material or predominately polymer material core layer of each of the polymer-based composite structural underlayment boards may be a polymer foam material or a predominantly polymer foam material core layer. Preferably, the polymer material of the core layer is a polyisocyanurate or predominantly polyisocyanurate material. At least one and preferably both of the major surfaces of the core layer of each of the polymer-based composite structural underlayment boards are overlaid by a facer that reinforces and strengthens the polymer-based composite structural underlayment board, that is generally coextensive with and bonded to the overlaid major surface of the core layer of the polymer-based composite structural underlayment board, that provides a good bonding surface for strongly and securely bonding a nonstructural finish-flooring layer to an underlayment layer formed by a plurality of the polymer-based composite structural underlayment boards, that enhances the dimensional stability of the polymer-based composite structural underlayment board, and that otherwise enhances the performance of the polymer-based composite structural underlayment board. Preferably, at least the facer on the top major surface of the core layer of each of the polymer-based composite structural underlayment boards is alkali resistant to retard or substantially eliminate any material degradation of the facer when a nonstructural finish-flooring layer is bonded to the underlayment boards with a mortar bed.

DETAILED DESCRIPTION OF THE INVENTION

Figure 1:
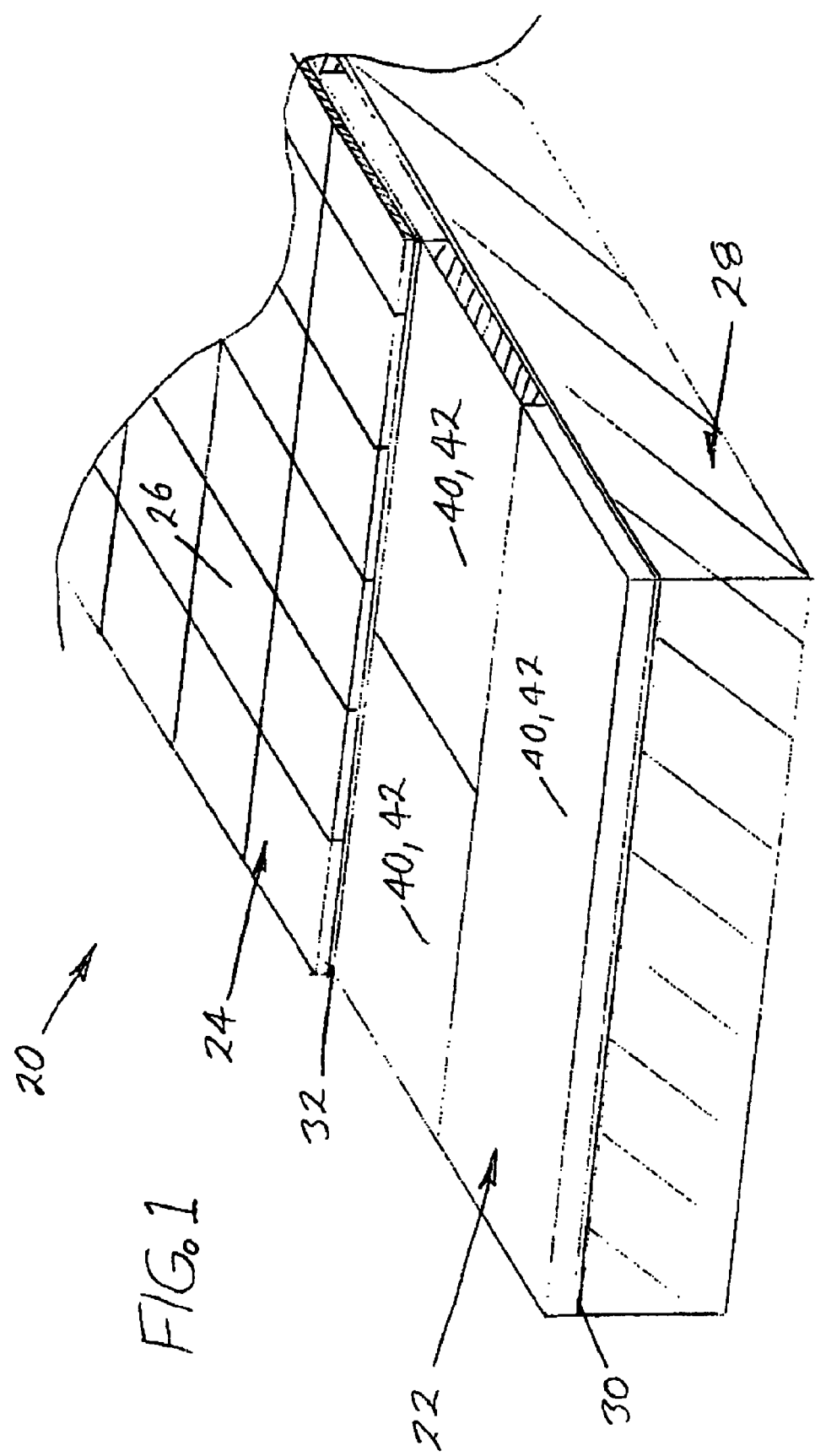
FIG. 1 is a fragmentary schematic perspective view of a flooring system utilizing the polymer-based composite structural underlayment board of the subject invention.
Figure 2:
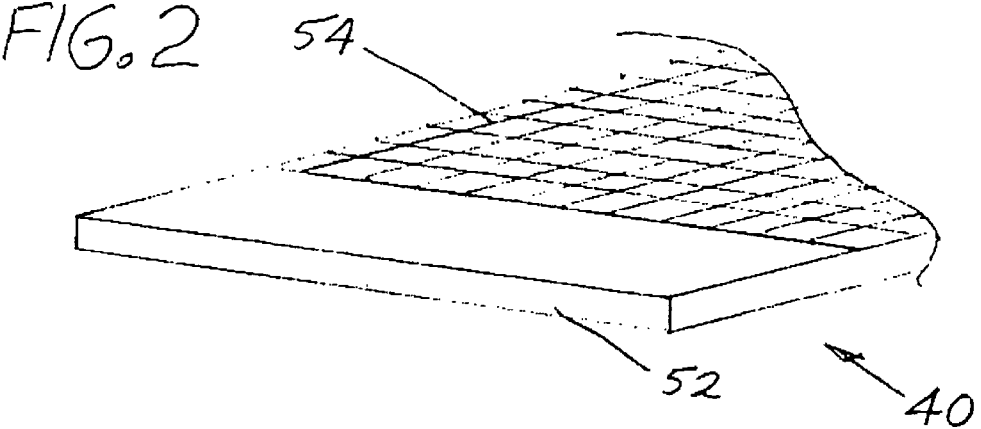
FIG. 2 is a fragmentary schematic perspective view of a first embodiment of the polymer-based composite structural underlayment board of the subject invention with portions broken away to better show the layers of composite.
Figure 3:
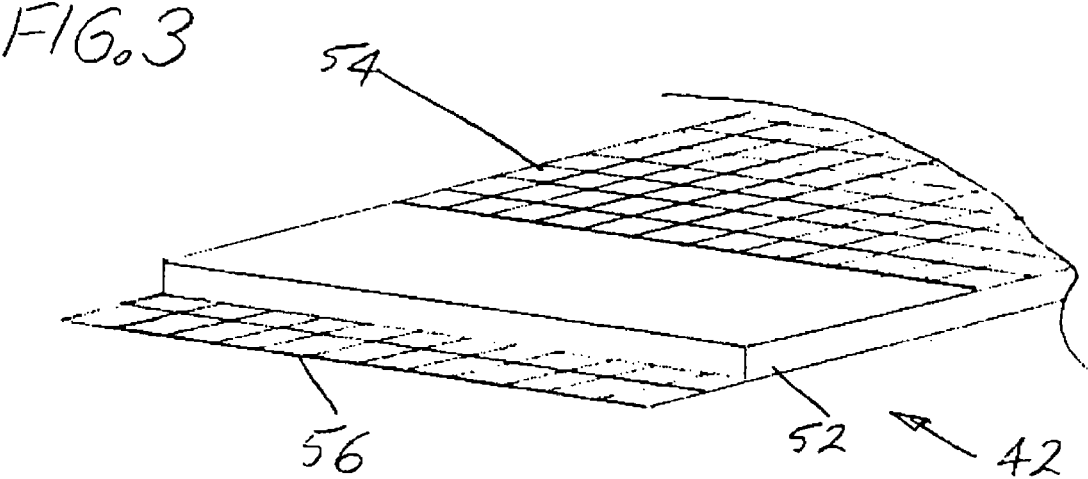
FIG. 3 is a fragmentary schematic perspective view of a second embodiment of the polymer-based composite structural underlayment board of the subject invention with portions broken away to better show the layers of composite.

As schematically shown in FIG. 1, the flooring system 20 of the subject invention includes an underlayment layer 22 formed by a plurality of the polymer-based composite structural underlayment boards 40 or 42 of FIGS. 2 and 3 and a nonstructural finish-flooring layer 24. While the nonstructural finish-flooring layer 24 may be made of other nonstructural finish-flooring materials such as: thin, flat or substantially flat, manmade or natural, hard, rigid stone slabs (e.g. marble slabs and flagstones such as sandstone and shale slabs), linoleum, or resilient tiles (e.g. vinyl tiles), as shown, the nonstructural finish-flooring layer 24 is formed by a plurality of hard, rigid tiles 26 (e.g. 8×8 inch or 12×12 inch ceramic tiles). The underlayment layer 22 is normally coextensive with or substantially coextensive with an upper surface of a building subfloor structure 28, such as but not limited to a concrete floor slab. The polymer-based composite structural underlayment boards 40 or 42 of the underlayment layer 22 are typically secured to the subfloor structure 28 by an adhesive layer 30 (e.g. a mortar bed or an epoxy mortar bed), nails, screws, other conventional mechanical fasteners, or are otherwise secured to the upper surface of the subfloor structure 28. The nonstructural finish-flooring layer 24 is normally coextensive with or substantially coextensive with the underlayment layer 22. The rigid tiles 26, stone slabs, linoleum, or resilient tiles of nonstructural finish-flooring layer 24 are adhesively bonded to the upper surface of the underlayment layer 22 by an adhesive layer 32 such as a mortar bed layer, an epoxy mortar bed layer, or other adhesive layer capable of forming a strong, secure bond between the underlayment layer 22 and the nonstructural finish-flooring layer 24.

While typically there is no layer (other than an adhesive bonding layer when used) between the polymer-based composite structural underlayment boards 40 or 42 of the underlayment layer 22 and the subfloor structure 28, for certain applications (e.g. where a flooring system is being renovated) an existing nonstructural finish-flooring layer such as but not limited to tile or linoleum may be left in place between the underlayment boards 40 or 42 and the subfloor structure 28. For these applications, preferably, the underlayment boards 40 or 42 are secured to the subfloor structure 28 by nails, screws, or other mechanical fasteners that pass through the existing nonstructural finish-flooring layer and into the subfloor structure 22.

The polymer-based composite structural underlayment board 40 of FIG. 2 includes a polymer material or predominantly polymer material core layer 52 and a facer 54 coextensive with or substantially coextensive with and bonded to a first major surface (preferably the top major surface) of the core layer 52. The polymer-based composite structural underlayment board 42 of FIG. 3 includes a polymer material or predominantly polymer material core layer 52; a first facer 54 coextensive with or substantially coextensive with and bonded to a first major surface (top major surface) of the core layer 52; and a second facer 56 coextensive with or substantially coextensive with and bonded to a second major surface (bottom major surface) of the core layer 52.

The top major surface and the bottom major surface of the polymer or predominantly polymer material core layer 52 of the polymer-based composite structural underlayment boards 40 and 42 are each defined by the length and the width of the polymer or predominantly polymer material core layer. The polymer or predominantly polymer material core layer 52 typically has a width of about four feet or greater and a length of about four feet or greater, preferably, a length of about eight feet or greater, and could have lengths that are limited only by the ability to store, transport, and handle the polymer-based composite structural underlayment boards 40 and 42 prior to installation.

The polymer or predominantly polymer material core layer 52 of the polymer-based composite structural underlayment boards 40 and 42 may be made of various polymer or predominantly polymer materials [e.g. a polyisocyanurate, polyurethane, polystyrene, or phenolic material or a material made of a blend of these materials; a polyisocyanurate, polyurethane, polystyrene, or phenolic foam material or a foam material made of a blend of these materials; a predominantly polyisocyanurate, polyurethane, polystyrene, or phenolic material with up to 40% by weight, but typically between about 1% and about 25% by weight organic and/or inorganic filler(s) or a material made of a blend of these materials with up to 40% by weight, but typically between about 1% and about 25% by weight organic and/or inorganic filler(s); a predominantly polyisocyanurate, polyurethane, polystyrene, or phenolic foam material with up to 40% by weight, but typically between about 1% and about 25% by weight organic and/or inorganic filler(s) or a foam material made of a blend of these materials with up to 40% by weight, but typically between about 1% and about 25% by weight organic and/or inorganic filler(s), a material made of other thermoset matrix polymers; etc.]. However, a preferred material for the core layer 52 is a polyisocyanurate material or foam material or a predominantly polyisocyanurate material or foam material with up to 40% by weight, but typically between about 1% and about 25% by weight organic and/or inorganic filler(s). Examples of various fillers that may be used in the predominantly polymer materials of the core layer 52 include but are not limited to powdered, liquid, and fiber fillers. The polymer or predominantly polymer materials of the core layer 52 may also include fiber reinforcements, fungi growth-inhibiting agents, fire-retardants, and other agents to reduce the cost of and/or modify the properties of the core layer 52, such as but not limited to the compressive strength, the toughness, the flexibility, the friability, and the fire resistance of the core layer. Examples of fillers, which may be used in the predominantly polymer material core layer 52, are fillers such as but not limited to limestone ($CaCO_3$), fiberglass, recycled polyisocyanurate dust, extenders/plasticizers, ground up foam insulation, ground up rubber, wood dust, etc.

The first facer 54 of the polymer-based composite structural underlayment board 40 and the first and second facers 54 and 56 of the polymer-based composite structural underlayment board 42 typically overlie the entire or substantially the entire major surface of the core layer 52 of the polymer-based composite structural underlayment board 40 or 42 to which the facer is or facers are bonded. The facers 54 and 56 of the polymer-based composite structural underlayment boards 40 and 42 may be any sheet material that provides suitable top and/or bottom major surfaces for the polymer-based composite structural underlayment boards 40 and 42, such as but not limited to coated or uncoated paper, foil, coated or uncoated woven or nonwoven mats made of fiberglass and/or other fibers or filaments, coated or uncoated scrims made of fiberglass and/or other fibers or filaments, etc. However, since alkali containing adhesive layers (e.g. mortar layers) are commonly used to bond the nonstructural finish-flooring layer 24 to the underlayment layer 22, a preferred facer material for the facers 54 and 56, especially for the top facer 54, is an alkali resistant facer material such as a mineral coated fiberglass scrim wherein the mineral coating protects the fiberglass scrim from alkali degradation.

The polymer-based composite structural underlayment boards of the subject invention preferably have the following physical properties:

| Property | Range or Minimum | Preferred Range or Minimum |
|---|---|---|
| Thickness | 0.15 to 0.75 inches | 0.25 to 0.50 inches |
| Density | 1.6 to 25 lbs/ft$^3$ | 3 to 10 lbs/ft$^3$ |

-continued

| Property | Range or Minimum | Preferred Range or Minimum |
|---|---|---|
| Compressive Strength | | |
| Rigid Tile or Stone 64 in² or greater | at least 25 psi | at least 50 psi |
| Linoleum or Resilient Tile | at least 250 psi | at least 500 psi |
| Flexural Strength | | |
| Modulus of Rigidity (MOR) | at least 400 psi | at least 1500 psi |
| Load at Yield | at least 20 lbf | at least 30 lbf |
| Fastener Pull Through (ASTM Test D1037 - in effect - June 2006) | at least 20 lbf | at least 50 lbf |
| Water Absorption by Volume (ASTM Test C209 - in effect - June 2006) | 4% or less | 2% or less |
| Thermal Conductivity | R-value of at least 1 | |
| Flame Spread Rating (ASTM Test E84 - in effect June 2006) | at least 20 | at least 25 |
| Fungus Growth Resistance | Does Not Support Fungus Growth | |

The greater minimum compressive strength of the polymer-based composite structural underlayment boards 40 and 42, which are intended for use with nonstructural finish-flooring layers 24 made of linoleum or resilient tiles, enables an underlayment layer 22 of the polymer-based composite structural underlayment boards 40 and 42 to provide a nonstructural finish-flooring layer 24 of linoleum or resilient tiles with a supporting surface that is sufficiently rigid and strong not to yield under normal service conditions.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A polymer-based composite structural underlayment board for use in the formation of a building flooring system underlayment layer to which a nonstructural finish-flooring layer is bonded, comprising:
a polymer material or predominantly polymer material core layer with a density between 1.6 lbs/ft$^3$ and 25 lbs/ft$^3$; the core layer having a length, a width, and a thickness; the core layer having a top major surface and a bottom major surface that are each defined by the length and the width of the core layer; at least one of the major surfaces of the core layer being overlaid by a facer that reinforces, stabilizes, and strengthens the polymer-based composite structural underlayment board and that is generally coextensive with and bonded to the overlaid major surface of the core layer;
wherein the polymer-based composite structural underlayment board has a compressive strength of at least 25 psi, a flexural strength (MOR) of at least 400 psi, a flexural strength (load at yield) of at least 20 lbf, and a fastener pull through strength of at least 20 lbf.

2. The underlayment board according to claim 1, wherein: the facer is an alkali resistant facer and the facer is bonded to the top major surface of the core layer.

3. The underlayment board according to claim 2, wherein: the alkali resistant facer is a mineral coated, nonwoven fiberglass mat or fiberglass scrim.

4. The underlayment board according to claim 1, wherein: the core layer is a predominantly polymer material core layer; the thickness of the core layer is between about 0.15 inches and about 0.75 inches; and the polymer material of the core layer is a polyisocyanurate material.

5. The underlayment board according to claim 4, wherein: the predominantly polymer material core layer contains between 1% and 40% by weight inorganic and/or organic filler material.

6. The underlayment board according to claim 4, wherein: the top and bottom major surfaces of the core layer are each overlaid by a facer that reinforces, stabilizes, and strengthens the polymer-based composite structural underlayment board and that is generally coextensive with and bonded to the overlaid major surface of the core layer.

7. The underlayment board according to claim 4, wherein: the polymer-based composite structural underlayment board has a water absorption rate of 4% by volume or less.

8. The underlayment board according to claim 1, wherein: the core layer is a predominantly polymer foam material core layer; the thickness of the core layer is between about 0.15 inches and about 0.75 inches; and the polymer material of the core layer is a polyisocyanurate material.

9. The underlayment board according to claim 8, wherein: the predominantly polymer foam material core layer contains between 1% and 40% by weight inorganic and/or organic filler material.

10. The underlayment board according to claim 8, wherein: the top and bottom major surfaces of the core layer are each overlaid by a facer that reinforces, stabilizes, and strengthens the polymer-based composite structural underlayment board and that is generally coextensive with and bonded to the overlaid major surface of the core layer.

11. The underlayment board according to claim 8, wherein: the polymer-based composite structural underlayment board has a water absorption rate of 4% by volume or less.

12. The underlayment board according to claim 8, wherein: the facer is an alkali resistant facer and the facer is bonded to the top major surface of the core layer.

13. A building flooring system, comprising:
a plurality of polymer-based composite structural underlayment boards overlaying and secured to a building subfloor and forming an underlayment layer over the building subfloor; each of the polymer-based composite structural underlayment boards having a polymer material or predominantly polymer material core layer with a density between 1.6 lbs/ft$^3$ and 25 lbs/ft$^3$; the core layer of each of the polymer-based composite structural underlayment boards having a length, a width, and a thickness; the core layer of each of the polymer-based composite structural underlayment boards having a top major surface and a bottom, major surface that are each defined by the length and the width of the core layer; at least one of the major surfaces of the core layer of each of the polymer-based composite structural underlayment boards being overlaid by a facer that reinforces and strengthens the polymer-based composite structural underlayment board and that is generally coextensive with and bonded to the overlaid major surface of the core layer of the polymer-based composite structural underlayment board; and a nonstructural finish-flooring layer overlaying and bonded to the underlayment layer;

wherein each of the polymer-based composite structural underlayment boards has a compressive strength of at least 25 psi, a flexural strength (MOR) of at least 400 psi., a flexural strength (load at yield) of at least 20 lbf, and a fastener pull through strength of at least 20 lbf.

14. The flooring system according to claim 13, wherein:
the facer of each polymer-based composite structural underlayment board is an alkali resistant facer and the facer is bonded to the top major surface of the core layer of the polymer-based composite structural underlayment board.

15. The flooring system according to claim 14, wherein:
the alkali resistant facer of each polymer-based composite structural underlayment board is a mineral coated, nonwoven, fiberglass mat or fiberglass scrim.

16. The flooring system according to claim 13, wherein:
the core layer of each of the polymer-based composite structural underlayment boards is a predominantly polymer material core layer; the thickness of the core layer of each of the polymer-based composite structural underlayment boards is between about 0.15 inches and about 0.75 inches; and the polymer material of the core layer of each of the polymer-based composite structural underlayment boards is a polyisocyanurate material.

17. The flooring system according to claim 16, wherein:
the predominantly polymer material core layer contains between 1% and 40% by weight inorganic and/or organic filler material.

18. The flooring system according to claim 16, wherein:
the top and bottom major surfaces of the core layer of each of the polymer-based composite structural underlayment boards are each overlaid by a facer that reinforces, stabilizes, and strengthens the polymer-based composite structural underlayment board and that is generally coextensive with and bonded to the overlaid major surface of the core layer of the polymer-based composite structural underlayment board.

19. The flooring system according to claim 16, wherein:
each of the polymer-based composite structural underlayment boards has a water absorption rate of 4% by volume or less.

20. The flooring system according to claim 13, wherein:
the core layer of each of the polymer-based composite structural underlayment boards is a predominantly polymer foam material core layer; the thickness of the core layer of each of the polymer-based composite structural underlayment boards is between about 0.15 inches and about 0.75 inches; and the polymer material of the core layer is a polyisocyanurate material.

21. The flooring system according to claim 20, wherein:
the predominantly polymer foam material core layer contains between 1% and 40% by weight inorganic and/or organic filler material.

22. The flooring system according to claim 20, wherein:
the top and bottom major surfaces of the core layer of each of the polymer-based composite structural underlayment boards are each overlaid by a facer that reinforces, stabilizes, and strengthens the polymer-based composite structural underlayment board and that is generally coextensive with and bonded to the overlaid major surface of the core layer of the polymer-based composite structural underlayment board.

23. The flooring system according to claim 20, wherein:
each of the polymer-based composite boards has a water absorption rate of 4% by volume or less.

24. The flooring system according to claim 20, wherein:
the facer of each polymer-based composite structural underlayment board is an alkali resistant facer and the facer is bonded to the top major surface of the core layer of the polymer-based composite structural underlayment board.

25. The flooring system according to claim 13, including:
a second nonstructural finish-flooring layer intermediate the underlayment layer and the building subfloor.

* * * * *